Jan. 28, 1969

J. W. HANNA 3,424,020

POWER STEERING APPARATUS

Filed July 3, 1967

INVENTOR:
JOHN W. HANNA
BY
Harrington A. Lackey
ATTORNEY

United States Patent Office 3,424,020
Patented Jan. 28, 1969

3,424,020
POWER STEERING APPARATUS
John W. Hanna, P.O. Box 696, Gallatin, Tenn. 37066
Filed July 3, 1967, Ser. No. 650,812
U.S. Cl. 74—388
Int. Cl. F16h *35/04*
4 Claims

ABSTRACT OF THE DISCLOSURE

Mechanical power steering apparatus for a motor vehicle having a steering post including an externally threaded sleeve adapted to be detachably secured to the steering post, a pair of bevel gears freely rotatably mounted and spaced apart on the sleeve, an internally threaded clutch mounted on and in threaded engagement with the sleeve between the gears for alternate driving engagement with each gear, a pinion gear engaging both bevel gears for rotating the bevel gears in opposite directions, and means for driving the pinion gear.

Background of the invention

This invention relates to a mechanical power steering apparatus for a motor vehicle, and more particularly to a power steering apparatus unit which may be installed on an existing steering post in the motor vehicle.

Although mechanical power steering apparatus for motor vehicles are known in the art, such as the Lemon Patent No. 1,763,470 and the Woolley Patent No. 2,667,232, nevertheless such prior power steering apparatus have been designed either as a part of the original steering equipment of the automobile, or are so complicated that a considerable amount of reconstruction is required in order to install the apparatus into an existing steering mechanism. For example, in the Lemon Patent 1,763,470, the steering post 4 has to be connected through bevel gears to a special two-section steering shaft 6 and 11, one of which must be threaded. Moreover, since the clutch is tapered, the hubs of the bevel gears must also be tapered.

Summary of the invention

One object of this invention is to provide a mechanical power steering apparatus which may be easily installed upon the existing steering post of a motor vehicle, and easily connected to existing power transmitting mechanisms in the motor vehicle in order to drive the apparatus.

A further object of this invention is to provide a mechanical power steering apparatus which may easily be slipped over and detachably secured to the steering post of a motor vehicle and provided with transmission which may be easily connected to the engine, fan pulley or generator by an endless belt for driving the apparatus.

Another object of this invention is to provide a power steering apparatus in which the components are mounted compactly within a comparatively small housing.

Another object of this invention is to provide a power steering apparatus unit which may be detachably or adjustably secured along any portion of the steering post, and having power input components adjustable for proper alignment and operative engagement with the existing power take-off mechanism of the motor vehicle.

Description of the preferred embodiment

Figure 1:
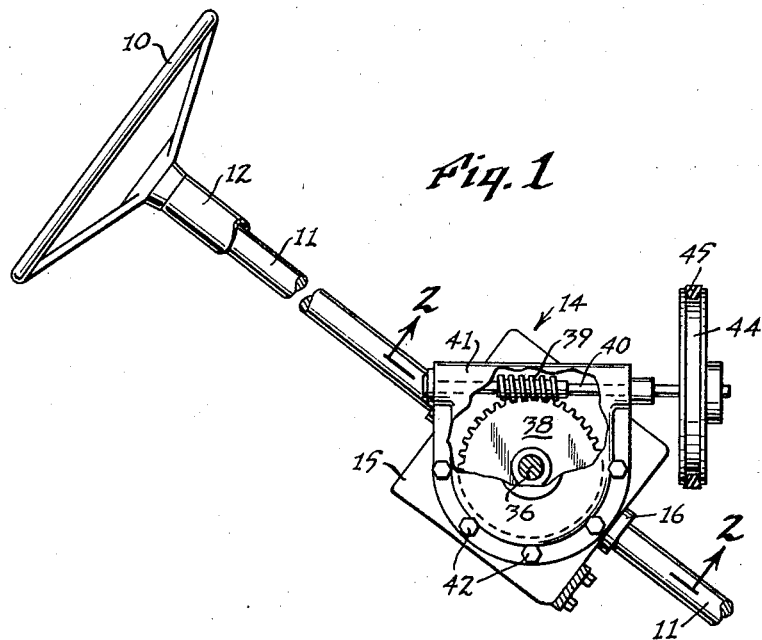
FIG. 1 is a side elevation of the invention mounted upon the steering post of a motor vehicle, with parts broken away.

FIG. 1 discloses a steering wheel 10 supported on steering post 11 rotatably mounted in steering column 12 to steer the front wheels of a conventional motor vehicle.

The power steering apparatus 14 made in accordance with this invention includes a housing 15 in which is mounted a rotatable sleeve 16. The sleeve 16 is rotatably journalled in the bearings 17 within the housing 15 and supported against longitudinal movement by means such as the thrust collars 18 fixed to the sleeve 16. The sleeve 16 extends entirely through the housing 15 and is adapted to receive the steering post 11 and to be fixed to the post 11 by means, such as one or more set screws 19. It will be understood that any other type of means for readily detachably securing the sleeve 16 to the steering post 11 may be employed if desired.

The middle portion 20 of the sleeve 16 is externally threaded. The end portions of the sleeve 16 on opposite sides of the externally threaded middle portion 20 are smooth and cylindrical to provide bearing surfaces, not only for engaging the sleeve bearings 17, but also for supporting the bevel gears 21 and 22 for free rotatable movement on opposite sides of the threaded middle portion 20.

Mounted upon the sleeve 16 between the bevel gears 21 and 22 is a clutch block 24 having frictional clutch discs 25 and 26 mounted on opposite ends for alternate driving engagement with the inner faces of the bevel gears 21 and 22. Extending longitudinally through the clutch block 24 and the clutch faces 25 and 26 is an internally threaded opening 27 for threadedly engaging the externally threaded middle portion 20 of the sleeve 16. The overall length of the clutch block 24 including the clutch faces 25 and 26 is approximately the same as the axial spacing between the bevel gears 21 and 22. The clutch block 24 is disposed upon the sleeve 16 so that when the steering post 11 is in a neutral position, that is the front wheels are directed in a straight course, each clutch face 25 and 26 will lightly engage its corresponding bevel gear 21 and 22. Thus, when the steering post 11 is turned, the clutch block 24 will be lightly held against rotational movement until the rotating sleeve 16 screw feeds the block 24 axially toward driving engagement with one bevel gear, such as 22, and away from engagement with the other bevel gear 21.

A bevel pinion gear 35 is fixed at one end of the pinion shaft 36 which may be journalled in any convenient manner in the housing 15. The pinion gear 35 engages both bevel gears 21 and 22 simultaneously so that when the pinion gear 35 is rotated, the bevel gears 21 and 22 are rotated in opposite directions. Fixed to the opposite end of the pinion shaft 36 is a wormwheel 38 engaging worm 39 fixed to or formed upon wormshaft 40. The wormshaft 40 is journalled for rotation within the worm housing 41, which is detachably secured to the main housing 15 by means such as bolt 42.

The wormshaft 40 may be driven by any convenient means, but preferably from an existing power take-off mechanism within the motor vehicle engine, such as the motor shaft, generator shaft, or fan shaft. One means of accomplishing this is through a driven pulley 44 fixed to one end of the wormshaft 40, and a drive pulley fixed to one of the above named existing shafts, not shown. Both the drive pulley, not shown, and the driven pulley 44 are coupled by the endless belt 45.

In operating the invention, the apparatus 14 may be installed in an existing motor vehicle with no or very few modifications of the motor vehicle structure. One end of the steering post 11 must be freed to be inserted through the sleeve 16. When the sleeve 16 has been moved to its desired longitudinal position on the steering post 11, the set screw 19 is tightened to secure the sleeve 16, and consequently the entire apparatus 14 in a fixed position relative to the shaft 11. If needed, a drive pulley may be installed upon any one of the above existing power take-off shafts, or any other power take-off shaft, and the belt 45 installed about the drive pulley, not shown, and the driven pulley 44. If the drive pulley and driven pulley 44 are not properly aligned, the bolts 42 may be removed and the worm housing 41 rotated about the axis of the pinion shaft 36 until the necessary alignment between the pulleys is obtained. Then, the bolts 42 may be reassembled into the closest corresponding bolt holes available. It will be obvious that the degree of alignment of the pulleys will depend upon the number and circumferential spacing of the bolt holes to receive the bolts 42.

Figure 2:
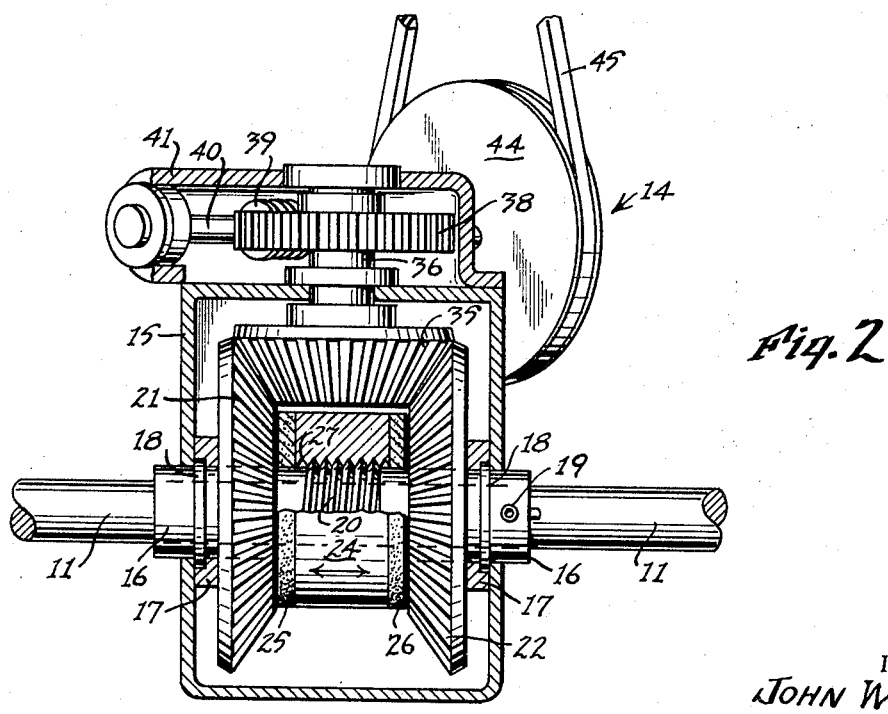
FIG. 2 is an enlarged section taken along the line 2–2 of FIG. 1.

After the power steering apparatus 14 has been assembled, the clutch block 24 will remain in its neutral position, with clutch faces 25 and 26 lightly engaging the corresponding bevel gears 21 and 22, as long as the steering post 11 is in its neutral position, as disclosed in FIG. 2. In the neutral position with the engine running, the bevel gears 21 and 22 will be constantly rotating in opposite directions freely about the outer bearing portions of the sleeve 16, yet contiguous to the opposite clutch faces 25 and 26.

When the operator of the vheicle turns the steering wheel 10 to the right, the steering post 11 and sleeve 16 will also be rotated to the right causing the threaded middle portion 20 engaging the internally threaded opening 27 to move the clutch block 24 in the axial direction to cause the clutch face, such as 25, to drivingly engage the bevel gear 21, assuming that the bevel gear 21 is rotating in the same direction as the steering post 11. Upon driving engagement of the clutch face 25 and the bevel gear 21, the driven bevel gear 21 will take over the rotation of the steering post 11 to assist the operator in turning the vehicle to the right. After the right turn is completed, and the steering wheel 10 is manually returned to its original neutral position, the clutch block 24 is returned to its neutral position (FIG. 2) so that the power steering apparatus 14 is dis-engaged from the steering post 11.

When the operator desires to make a left turn, the counter-rotating steering post 11 drives the clutch block 24 in the opposite direction to cause the clutch face 26 to drivingly engage the bevel gear 22, which transmits the power of the driven pulley 44 to the steering post 11 to mechanically assist the operator in turning the vehicle to the left. When the steering wheel 10 is returned to its neutral position, the clutch block 24 is returned to its neutral position (FIG. 2) to dis-engage the power steering apparatus 14.

By providing a rotatable externally threaded sleeve within the unit 14, the apparatus 14 may accommodate the existing steering post 11 of most vehicles without any, or with very few, modifications. The apparatus 14 is compact since the entire clutch mechanism and clutch feed mechanism is disposed between the bevel gears 21 and 22.

The combination of the sleeve construction for receiving the steering post as well as the adjustable worm housing 41 permits the apparatus to be located in the optimum position for convenient driving connection to the existing power take-off devices in a motor vehicle.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A power steering apparatus for a motor vehicle having a steering post comprising:
    (a) a housing,
    (b) a sleeve rotatably journalled in said housing and adapted to receive and be fixed to said steering post extending through said housing,
    (c) said sleeve having an externally threaded middle portion and opposite end portions having external cylindrical bearing surfaces,
    (d) a clutch block having opposite ends comprising clutch faces and having an internally threaded opening threadedly engaging said middle portion,
    (e) first and second bevel gears mounted in said housing for free rotatable movement on said opposite end portions of said sleeve, each bevel gear opposing a clutch face for alternate driving engagement with said corresponding clutch face upon rotation of said sleeve in one direction or the other,
    (f) a pinion gear mounted for rotatable movement in said housing and operatively engaging both said bevel gears, and
    (g) means for driving said pinion gear to rotate said bevel gears in opposite directions.

2. The invention according to claim 1 in which said driving means comprises a pinion shaft fixed to said pinion gear and journalled in said housing, a wormwheel on said pinion shaft, a worm operatively engaging said wormwheel, and means for driving said worm.

3. The invention according to claim 2 in which said housing comprises a main housing and further comprises a worm housing, means rotatably mounting said worm in said worm housing, said worm driving means comprising a driven shaft projecting from said worm housing as a coaxial extension of said worm, means adjustably mounting said worm housing on said main housing to change the position of said driven shaft relative to said main housing.

4. The invention according to claim 3 in which said worm housing is rotatably adjustable about the axis of said pinion shaft.

References Cited
UNITED STATES PATENTS

| | | | |
|---|---|---|---|
| 1,355,152 | 10/1920 | Laird | 74—388 |
| 2,150,019 | 3/1939 | Baule | 74—388 |
| 2,876,651 | 3/1959 | Culp | 74—388 |
| 2,978,058 | 4/1961 | Orr | 74—388 |

DONLEY J. STOCKING, Primary Examiner.

L. H. GERIN, Assistant Examiner.

U.S. Cl. X.R.
74—404